(12) United States Patent
Ellis et al.

(10) Patent No.: US 7,624,410 B2
(45) Date of Patent: Nov. 24, 2009

(54) PROGRAM GUIDE APPLICATION INTERFACE SYSTEM

(75) Inventors: Michael D Ellis, Boulder, CO (US); Robert A Knee, Lansdale, PA (US)

(73) Assignee: United Video Properties, Inc., Tulsa, OK (US)

( * ) Notice: Subject to any disclaimer, the term of this patent is extended or adjusted under 35 U.S.C. 154(b) by 1092 days.

(21) Appl. No.: 10/684,326

(22) Filed: Oct. 10, 2003

(65) Prior Publication Data
US 2004/0139464 A1 Jul. 15, 2004

Related U.S. Application Data

(63) Continuation of application No. 09/145,232, filed on Sep. 1, 1998, now Pat. No. 6,665,869.

(60) Provisional application No. 60/058,073, filed on Sep. 5, 1997.

(51) Int. Cl.
*H04N 5/445* (2006.01)
(52) U.S. Cl. ............... 725/39; 725/37; 725/38; 725/61
(58) Field of Classification Search .......... None
See application file for complete search history.

(56) References Cited

U.S. PATENT DOCUMENTS

| | | | |
|---|---|---|---|
| 5,481,542 A | 1/1996 | Logston et al. | 370/94.2 |
| 5,559,548 A | 9/1996 | Davis et al. | 348/6 |
| 5,559,549 A | 9/1996 | Hendricks et al. | 348/6 |
| 5,585,866 A | 12/1996 | Miller et al. | 348/731 |
| 5,589,892 A | 12/1996 | Knee et al. | 348/731 |
| 5,600,364 A | 2/1997 | Hendricks et al. | 348/1 |
| 5,600,573 A | 2/1997 | Hendricks et al. | 364/514 |
| 5,635,978 A | 6/1997 | Alten et al. | 348/7 |
| 5,635,979 A | 6/1997 | Kostreski et al. | 348/13 |
| 5,659,350 A | 8/1997 | Hendricks et al. | 348/6 |
| 5,682,195 A | 10/1997 | Hendricks et al. | 348/6 |

(Continued)

FOREIGN PATENT DOCUMENTS

WO    WO 95/07003    3/1995

(Continued)

OTHER PUBLICATIONS

S. Hartwig, "Softwarearchitekturen für interaktive digitale Decoder," Fernseh-und Kino-Technik, 50(3):92-94, 96-98, 100-102 (1996).

(Continued)

*Primary Examiner*—Joseph P Hirl
*Assistant Examiner*—Fred Peng
(74) *Attorney, Agent, or Firm*—Ropes & Gray, LLP

(57) ABSTRACT

A program guide system is provided that supports a program guide application and multiple non-guide applications. The program guide system has a program guide application interface that allows the non-guide applications to use both device resources and program guide resources. The application interface maintains a list of registered applications and directs control requests from various applications to the current primary application. The application interface also has a user interface input director that directs keystrokes and other user input commands to the appropriate application. If a keystroke for the program guide application is detected while a non-guide application is running, the program guide application is invoked.

44 Claims, 9 Drawing Sheets

U.S. PATENT DOCUMENTS

| | | | |
|---|---|---|---|
| 5,734,853 A | 3/1998 | Hendricks et al. | 395/352 |
| 5,740,549 A | 4/1998 | Reilly et al. | 705/14 |
| 5,760,821 A | 6/1998 | Ellis et al. | 348/10 |
| 5,771,064 A | 6/1998 | Lett | 725/134 |
| 5,781,246 A | 7/1998 | Alten et al. | 348/569 |
| 5,850,218 A | 12/1998 | LaJoie et al. | 725/45 |
| 5,874,985 A | 2/1999 | Matthews, III | 725/32 |
| 5,907,323 A | 5/1999 | Lawler et al. | 725/41 |
| 6,163,316 A | 12/2000 | Killian | |
| 6,172,677 B1 | 1/2001 | Stautner et al. | |
| 6,209,025 B1 | 3/2001 | Bellamy | |
| 6,240,555 B1 | 5/2001 | Shoff et al. | 725/110 |
| 6,282,714 B1 | 8/2001 | Ghori et al. | 725/81 |
| 6,313,851 B1 | 11/2001 | Matthews, III et al. | 345/718 |
| 6,317,885 B1 | 11/2001 | Fries | 725/109 |
| 6,388,714 B1 | 5/2002 | Schein et al. | |
| 6,510,557 B1 | 1/2003 | Thrift | |
| 6,665,869 B1 | 12/2003 | Ellis et al. | |
| 2005/1001580 * | 1/2005 | LaJoie et al. | 725/44 |

FOREIGN PATENT DOCUMENTS

| | | |
|---|---|---|
| WO | WO 95/32585 | 11/1995 |
| WO | WO 96/09721 | 3/1996 |
| WO | WO 96/34491 | 10/1996 |
| WO | WO 96/41471 | 12/1996 |
| WO | WO 97/13368 | 4/1997 |
| WO | WO 97/18675 | 5/1997 |
| WO | WO 97/31480 | 8/1997 |
| WO | WO 97/42763 | 12/1997 |
| WO | WO 97/48230 | 12/1997 |
| WO | WO 97/49237 | 12/1997 |
| WO | WO 97/49242 | 12/1997 |
| WO | WO 98/06219 | 2/1998 |

OTHER PUBLICATIONS

"Set-Top Box Control Software: A Key Component in Digital Video," by Keith Rath et al., Philips J. Res. 50 (1996) pp. 185-199.

"OpenTV: Betriebssystem fur interaktives Fernsehen," by G. Hirtz et al., Femseh- Und Kino- Technik, 50, Jahrgan Nr. Mar. 1996.

"STB operating systems gear up for flood of data services," by T. Williams, Computer Design, Feb. 1996, pp. 67-80.

* cited by examiner

PROGRAM GUIDE APPLICATION INTERFACE SYSTEM

This application is a continuation of U.S. patent application Ser. No. 09/145,232, filed Sep. 1, 1998, which claims the benefit of U.S. provisional patent application No. 60/058,073, filed Sep. 5, 1997. Both of these prior applications are hereby incorporated by reference herein in their entireties.

BACKGROUND OF THE INVENTION

This invention relates to systems that support an interactive television program guide application and non-guide applications. More particularly, the invention relates to systems in which non-guide applications can use both device resources and program guide resources.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to access television program listings in different display formats. For example, a user may desire to view a grid of program listings organized in a channel-ordered list. Alternatively, the user may desire to view program listings organized by time, by theme (movies, sports, etc.), or by title (i.e., alphabetically ordered).

A user may also select a program for viewing or recording from the program guide. For example, the user may place a highlight region on top of a desired program listing and press a "record" button on a remote control. Pay programs may be ordered by placing the highlight region on a pay program listing and pressing an "order" button. Some program guides allow parents to block certain television programs based on criteria such as ratings information.

It would be desirable if the set-top box on which the interactive program guide is implemented could be used to support other applications in addition to the program guide application. For example, the user of the set-top box might wish to use the set-top box to implement an Internet browser application, a video-on-demand application, an interactive promotional channel application, a shopping application, etc. However, previously known program guide systems have generally been designed to run only one application at a time. With these systems the currently running application typically has exclusive control of set-top box resources such the on-screen display, tuner, remote control interface, light-emitting diodes, communications channels, etc. This may lead to conflicts. For example, if a non-guide application is running when the program guide application would normally have issued a reminder (e.g., for an upcoming television event), the user may not be able to receive the reminder. Moreover, the relatively high-level resources of the program guide application (such as parental control, program guide database access functions, etc.) have been unavailable to non-guide applications.

It is therefore an object of the present invention to provide an interactive television program guide system in which a program guide application and other applications may be implemented on the same set-top box and in which non-guide applications may use program guide resources.

SUMMARY OF THE INVENTION

This and other objects of the invention are accomplished in accordance with the principles of the present invention by providing an interactive program guide system which supports a program guide application and multiple non-guide applications. The system may be implemented on a set-top box or a comparable hardware platform. The program guide application runs on the set-top box to provide an interactive display of television program listings. A user may use the program guide to search for listings based on keywords, to order pay programs, to select a television program for recording, etc. The non-guide applications that run on the set-top box may include applications such as an Internet browser application, a video-on-demand application, an interactive promotional channel application, a shopping application, an electronic mail application, an audio-on-demand application, a banking application, a data services application, a wagering application, etc.

The applications use set-top box resources such as a display resource, a user input interface resource, a tuner resource, a communications circuitry resource, a memory resource, etc. The program guide application has program guide resources such as a parental control resource, a graphics library resource, a pay program purchasing resource, a program guide database access resource, a scheduling resource, a tuning resource, a menu resource, etc. The program guide resources are higher level resources than the device resources and are provided as part of the program guide. A program guide application interface allows the non-guide applications to use both the device resources and the program guide resources.

In addition, the program guide application interface allows applications to register and maintains a list of such registered applications. A control request processor within the program guide application interface directs control requests and suspend requests from the applications to the primary application that is running on the set-top box. The primary application processes the control requests and suspend requests and determines whether to relinquish control to a requesting application or whether to suspend operation of the primary application.

The program guide application interface intercepts keystrokes and other user input and determines to which application such user input should be sent. During registration, applications may provide the program guide application interface with key lists that identify the keys that application desires to use when it is the active application and when it is a background application.

The program guide application interface resolves conflicts between various applications as the applications contend for shared resources. For example, the application interface may coordinate requests from different applications to use the same key or to simultaneously use the display. In resolving such conflicts, the application interface may take account of which resources may not be shared, which resources may be shared without restriction, and which resources may be shared only with the guidance of the application interface.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
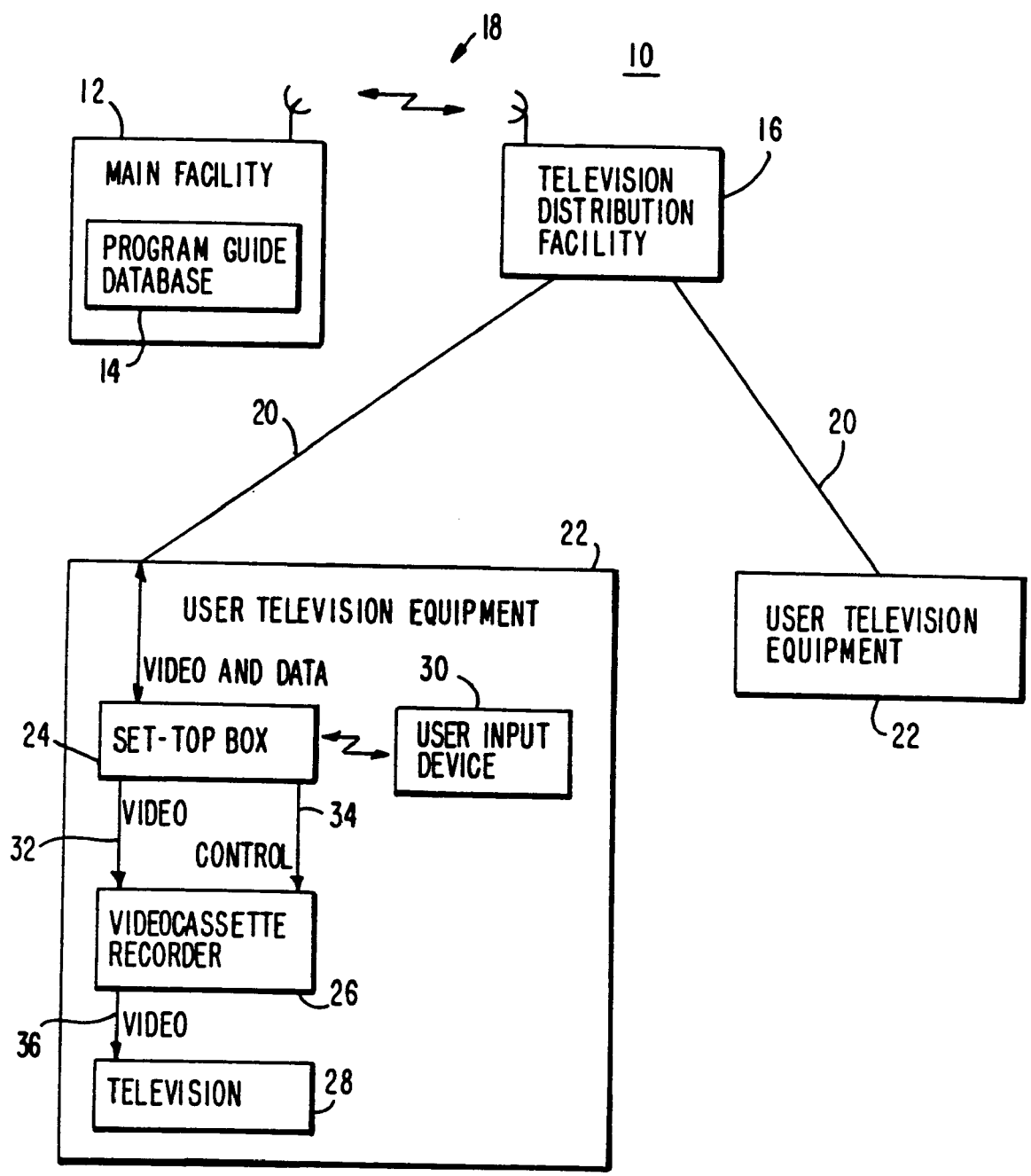
FIG. 1 is a schematic diagram of a system in accordance with the present invention.

An illustrative program guide system 10 in accordance with the present invention is shown in FIG. 1. Main facility 12 provides data from program guide database 14 to television distribution facility 16 via communications link 18. Link 18 may be a satellite link, a telephone network link, a cable or fiber optic link, a microwave link, a combination such links, or any other suitable communications path. Television distribution facility 16 may be a cable system headend, a broadcast distribution facility, or a satellite television distribution facility. If desired, television distribution facility 16 may have the capability to support (either alone or in combination with additional facilities) services such as Internet access, home shopping, video-on-demand services, electronic mail applications, audio-on-demand applications, banking applications, data services applications, wagering applications, etc. For example, if video-on-demand services are desired, television distribution facility 16 may contain a video or audio server. If home shopping services are to be provided, television distribution facility 16 may contain a home shopping database or may support communications to a home shopping service provider. Internet access may be provided by a server within television distribution facility 16 or may be provided by facilitating communications with a separate Internet service provider. Banking, wagering, and data services may be provided using facilities separate from television distribution facility 16. If desired, such separate facilities may be accessed through television distribution facility 16.

The data transmitted by main facility 12 to television distribution facility 16 includes television program guide data such as program times, channels, titles, descriptions and other program listings information, and pay program pricing information, copy protection information, etc. If desired, some data may be provided using data sources at facilities other than main facility 12. For example, data for supporting a home shopping application may be provided using a separate data facility (not shown).

Television distribution facility 16 distributes the program guide data and data for other services to multiple users via communications paths 20. Program guide data may be distributed periodically (e.g., once per hour or once each week). Each user has user television equipment 22. User television equipment 22 typically contains a set-top box 24, a videocassette recorder 26, and a television 28. Set-top box 24 may be controlled by a user input device 30 such as a remote control, wireless keyboard, mouse, trackball, etc.

Set-top box 24 contains a microprocessor and other circuitry for executing instructions to provide the features of the present invention. For example, an interactive television program guide may be implemented on set-top box 24 by executing a suitable program guide application. Other applications and a program guide application interface are also preferably implemented on set-top box 24. The applications and the program guide application interface may be implemented on user television equipment other than a set-top box if desired. However, the present invention will be illustrated with reference to a set-top box implementation for clarity.

Communications paths 20 preferably have sufficient bandwidth to allow television distribution facility 16 to distribute scheduled television programming, video-on-demand services, and other video information to user equipment 22 in addition to program guide data and data for other services. If desired, program guide data and data for other services may be distributed by one or more distribution facilities that are similar to but separate from television distribution facility 16 using communications paths that are separate from communications-paths 20.

Certain functions such as pay program purchasing may require user equipment 22 to transmit data to distribution facility 16 over communications paths 20. If desired, such data may be transmitted over telephone lines or other separate communications paths (not shown). Functions such as Internet services, home shopping services, etc. may also be provided using separate communications paths.

Multiple television channels (analog, digital, or both analog and digital) may be provided to set-top box 24 via communications path 20. During normal television viewing, the user tunes set-top box 24 to a desired one of these channels. The signal for that television channel may then be provided at video output 32 as a radio-frequency (RF) signal on a predefined channel (e.g., channel 3 or 4) or as a demodulated video signal. The video signal at output 32 is received by videocassette recorder 26, so that the user may record programs. Program recording and other features may be controlled by set-top box 24 using control path 34. A typical control path 34 involves the use of an infrared transmitter coupled to the infrared receiver in videocassette recorder 26 that normally accepts commands from a remote control. Such a remote control or other suitable user input device 30 may be used to control set-top box 24, videocassette recorder 26, and television 28.

Television 28 may receive RF or demodulated video signals from videocassette recorder 26 via path 36. The video signals on path 36 may either be generated by videocassette recorder 26 when playing back a prerecorded videocassette or may by passed through from set-top box 24. The video signals provided to television 28 may be real-time video signals such as a broadcast television program, a video-on-demand program, or video for a service with a real-time video component such as a promotional channel or home shopping service. The video signals may also contain information such as graphics and text to be displayed in addition to or in place of such real-time videos.

Figure 2:
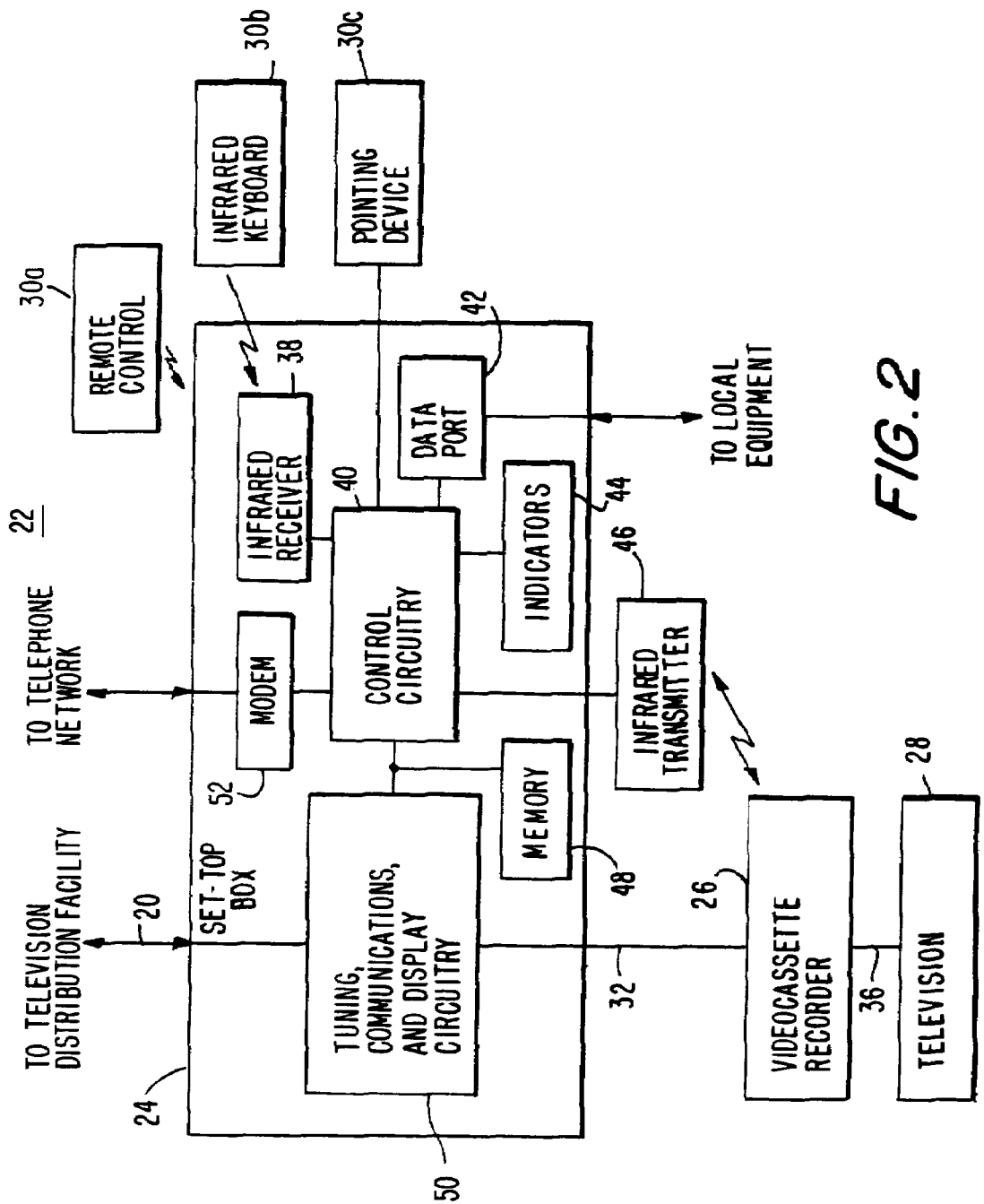
FIG. 2 is a schematic diagram of illustrative user television equipment in accordance with the present invention.

As shown in FIG. 2, multiple input devices may be used with set-top box 24. For example, infrared remote control 30a may be used to control the interactive program guide. Infrared keyboard 30b may be used when browsing the Internet or to enter information for the program guide. Pointing device 30c, which may be a mouse, trackball, touch-pad or other suitable pointing device, may be used when browsing the Internet. Signals from infrared devices may be received with infrared receiver 38. Other user input devices may be coupled more directly to control circuitry 40. The input devices shown in FIG. 2 are illustrative. Any suitable type of input device may be used, including infrared pointing devices, other types of wireless devices, hardwired remotes or keyboards, voice-recognition devices, etc.

Set-top box 24 may contain one or more data ports such as data port 42 for interfacing with local equipment such as a personal computer, printer or the like. Data port 42 may be compatible with any suitable communications protocol, such the IEEE 1394 bus standard, the RS-232 bus standard, or the USB (Universal Serial Bus) standard.

Indicators 44 may be used to display certain information directly on set-top box 24. For example, numeric indicators may be used to display the current channel to which set-top box 24 is tuned. Dedicated single-element indicators may be used to indicate that the power in the system is on or that a message has been received, etc.

Infrared transmitter 46 may be used to transmit control commands to the infrared receiver in videocassette recorder 26 (e.g., to direct videocassette recorder 26 to turn on and to record a television program that the user has selected from the program guide).

Memory 48 may be used to store data and instructions for execution by a microprocessor contained in control circuitry 40.

Set-top box 24 also contains tuning, communications, and display circuitry 50. Circuitry 50 handles tuning functions such as receiving and demodulating analog and digital video and audio streams. Circuitry 50 may also descramble pay channels and video-on-demand channels. If a program is copy protected and set-top box 24 receives proper authorization, circuitry 50 can remove the copy protection. Parents may lock certain programs so that they cannot be viewed by children. Circuitry 50 may block programs that have been locked by distorting the video and audio supplied at output 32 or by preventing children from tuning to the blocked programs.

Circuitry 50 also handles various communications functions. For example, downstream data such as program guide data from television distribution facility 16 (FIG. 1) may be supplied to set-top box 24 over an in-band, out-of-band, or vertical blanking interval link in communications path 20. Circuitry 50 provides such downstream data to control circuitry 40. Circuitry 50 also handles upstream data such as pay program purchasing information that is supplied to television distribution facility 16 (FIG. 1) over communications path 20. Additional communications functions may be provided using modem 52, which may be linked to television distribution facility 16 (FIG. 1) and other suitable data distribution and service provider facilities via the telephone network. If desired, a cable modem or other high-speed data communications device may be used for certain types of communications.

Circuitry 50 preferably allows various images to be displayed on television 28 via output 32 and path 36. Displayed images may include graphics, text, animations, etc. Images may be displayed in place of video information or may be displayed at the same time as video information (e.g., by using circuitry 50 as an image overlayer). Examples of images that may be displayed include program listings grids, web pages, product lists, promotional information, etc.

Figure 3:
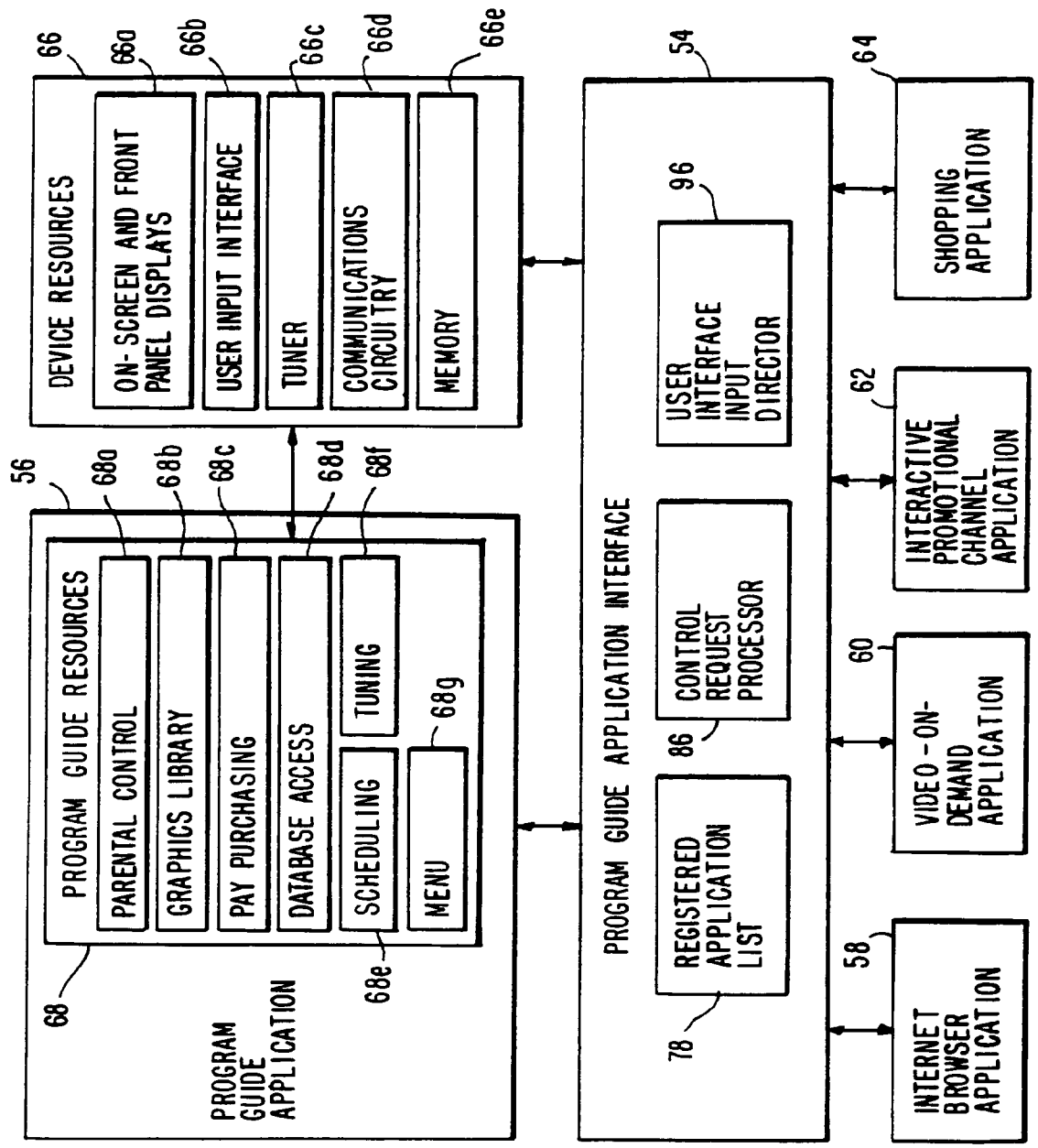
FIG. 3 is a schematic diagram showing the relationship between a program guide application interface, program guide application, non-guide applications, and various device resources in accordance with the present invention.

FIG. 3 shows how the system of the present invention has a program guide application interface 54 that supports a program guide application 56 and one or more non-guide applications such as Internet browser application 58, video-on-demand application 60, interactive promotional channel application 62, and shopping application 64. Other non-guide applications that may be supported include electronic mail applications, audio-on-demand applications, banking applications, data services applications, wagering applications, etc. Program guide application interface 54 may be part of program guide application 56 or may be separate, as shown in FIG. 3. Program guide application 56 provides the features of an interactive program guide using program guide resources 68. For example, program guide application 68 may obtain program listings data previously stored in memory using database access resource 68d. Program listings data may be displayed using various templates and display functions of graphics library resource 68b. Pay programs may be purchased using pay purchasing resource 68c. Program guide application 56 allows parents to lock programs using parental control resource 68a. Programs may be scheduled for recording and reminders for certain programs may be set using scheduling resource 68e. Tuning resource 68f may be used to ensure that the channels to which the program guide or other application that uses resource 68f tune satisfy predefined parental control criteria (using resource 68c) and are displayed properly on the viewer's display screen (e.g., as a flip or browse display). Tuning resource 68f may also be used to control the front-panel light-emitting diodes (LEDs) or other such display that is used to display channel numbers and the like. Menu resource 68g may be used to display various items on program guide menu display screens. Other illustrative program guide resources may be used to descramble certain programs, to receive and display e-mail, etc.

Program guide application interface 54 allows non-guide applications such as non-guide applications 58, 60, 62, and 64 to use program guide resources 68 or to use device resources 66 directly. For example, video-on-demand application 60 may display a list of program titles on television 28 (FIG. 2) using on-screen and front panel display resources 66a (i.e., the display circuitry portion of circuitry 50 of FIG. 2 and any associated set-top box software that drives indicators 44 and television 28). Video-on-demand application 60 may also display a list of program titles on television 28 using program guide graphics library resource 68b. Program guide graphics library resource 68b preferably supports functions for drawing the types of displays used in program guides. Typical graphics library functions include functions for generating lists of television program titles, program listings grids or tables, pay program ordering screens, menus, etc.

Using graphics library resource 68b involves the use of display resource 66a because implementing the functions of graphics library resource 68b involves the use of the circuitry of display resource 66a. Nevertheless, using the functions of graphics library resource 68b rather than using display resource 66a directly conserves resources, because the functions provided by graphics library resource 68b do not need to be duplicated by video-on-demand application 60.

Another program guide resource that video-on-demand application 60 may use is database access resource 68d. Database access resource 68d is a program guide resource that allows program guide application 56 to access program data (e.g., program titles, times, channels, ratings, summary information, etc.) that has been stored in memory. Although such data might be retrieved directly from memory using memory resource 66e, the database management functions of database access resource 68d help facilitate the orderly storage and retrieval of program data in memory. As a result, it is more efficient for video-on-demand application 60 to use database access resource 68d than to duplicate such functions within video-on-demand application 60.

Some of the functions of video-on-demand application 60 may be best provided using device resources 66. For example, when a user places an order for a video, the order may be transmitted via an upstream data path to a video server in television distribution facility 16. Such upstream transmissions can be accomplished using communications circuitry resource 66d.

Another illustrative example involves Internet browser application 58, which primarily relies on direct use of device resources 66. Display functions may be provided using display resource 66a. Internet communications functions may be provided using communications circuitry resource 66d (e.g., modem 52 of FIG. 2 and its associated software). Memory resource 66e may be used directly, because database access resource 68d is not required for Internet browsing. Internet browser application 58 can also use the user input interface resource 66b to support pointing device 30c (FIG. 2). If desired, a message light (one of indicators 44 of FIG. 2) may be turned on by Internet browser application 58 whenever Internet e-mail is received. Supporting this function may involve direct use of display resource 66a.

Interactive promotional channel application 62 uses different resources. For example, interactive promotional channel application 62 may not use the message light function of display resource 66a. Interactive promotional channel application 62 may support use of a remote control (user input interface resource 66b). Tuner resource 66c may be used to tune to an appropriate promotional channel from among the various channels of video provided to set-top box 24 via path 20 (FIG. 2). Program guide resources 68 that may be used by interactive promotional channel application 62 include pay purchasing resource 68c, database access resource 68d, and graphics library resource 68b. Pay purchasing resource 68c handles purchasing functions such as entering personal identification numbers (PIN), confirming purchases, and issuing reminders when programs are about to begin. Database access resource 68d handles functions such as accessing titles, broadcast times and program summaries. Graphics library resource 68b may be used to display banners and templates for program titles and program summary information.

Shopping channel application 64 may use graphics library resource 68b to display product lists. Communications circuitry resource 66d may be used to transmit product orders to an order processing facility. Various input devices may be supported using user input interface resource 66b, such as remote control 30a, keyboard 30b, and pointing device 30c.

These examples are illustrative only. Various other suitable applications may be used and such applications may use any suitable combinations of functions provided by program guide resources 68 and device resources 66.

Figure 4A:
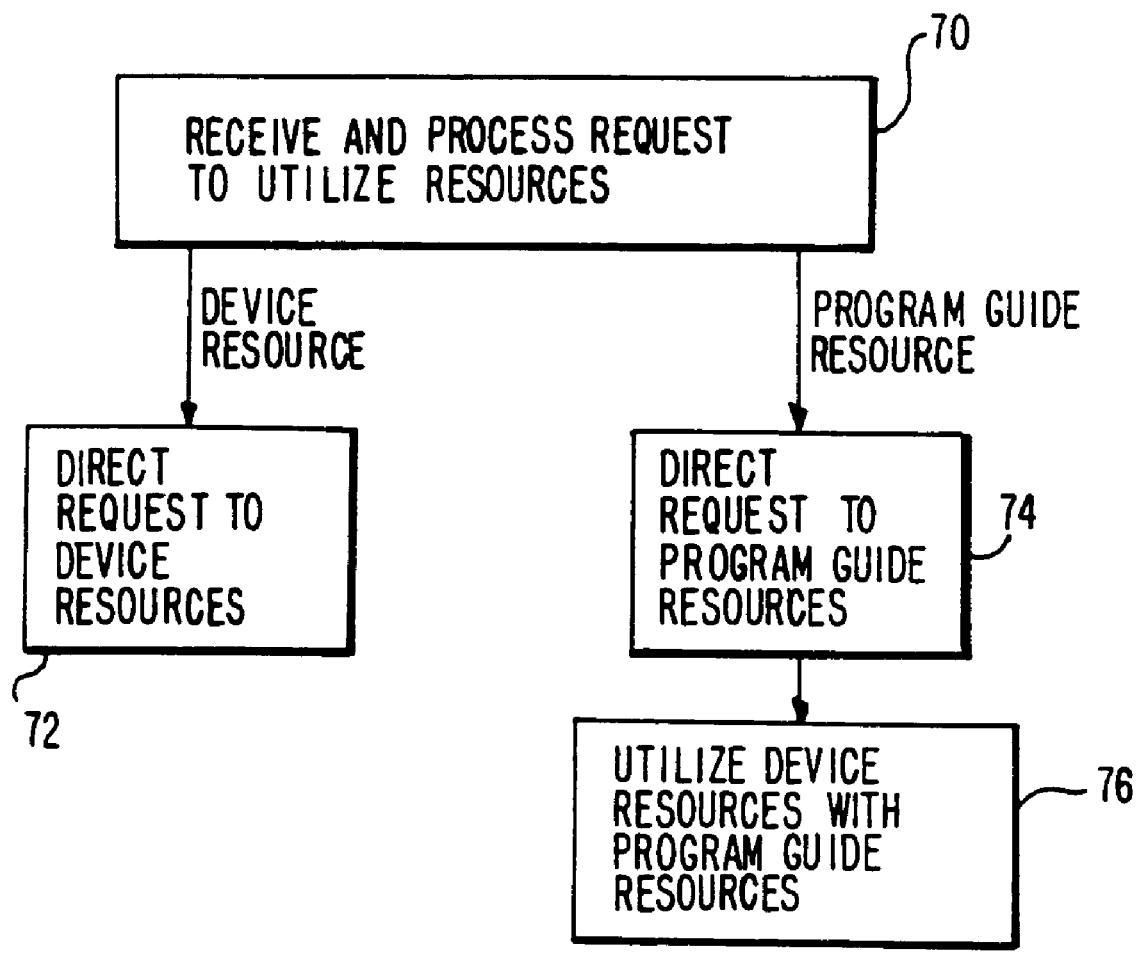
FIG. 4a is a flow chart of illustrative steps involved in processing requests to use resources with the program guide application interface in accordance with the present invention.

The process by which program guide application interface 54 handles requests from the non-guide applications to use program guide resources 68 and device resources 66 is shown in FIG. 4a. At step 70, program guide application interface 54 receives and processes requests from applications to use resources (e.g., to use graphics library 68b or display 66a). If a request is made to use one of device resources 66, program guide application interface 54 directs the request to device resources 66 at step 72, so that the requesting application may use the requested device resource 66. If a request is made to use one of program guide resources 68, program guide application interface 54 directs the request to program guide resources 68 at step 74. At step 76, the requesting application uses the device resources 66 that are involved in the use of the requested program guide resources 68 (e.g., the requesting application uses display 66a if a request was made to use graphics library 68b, which relies upon the use of display 66a).

Figure 4B:
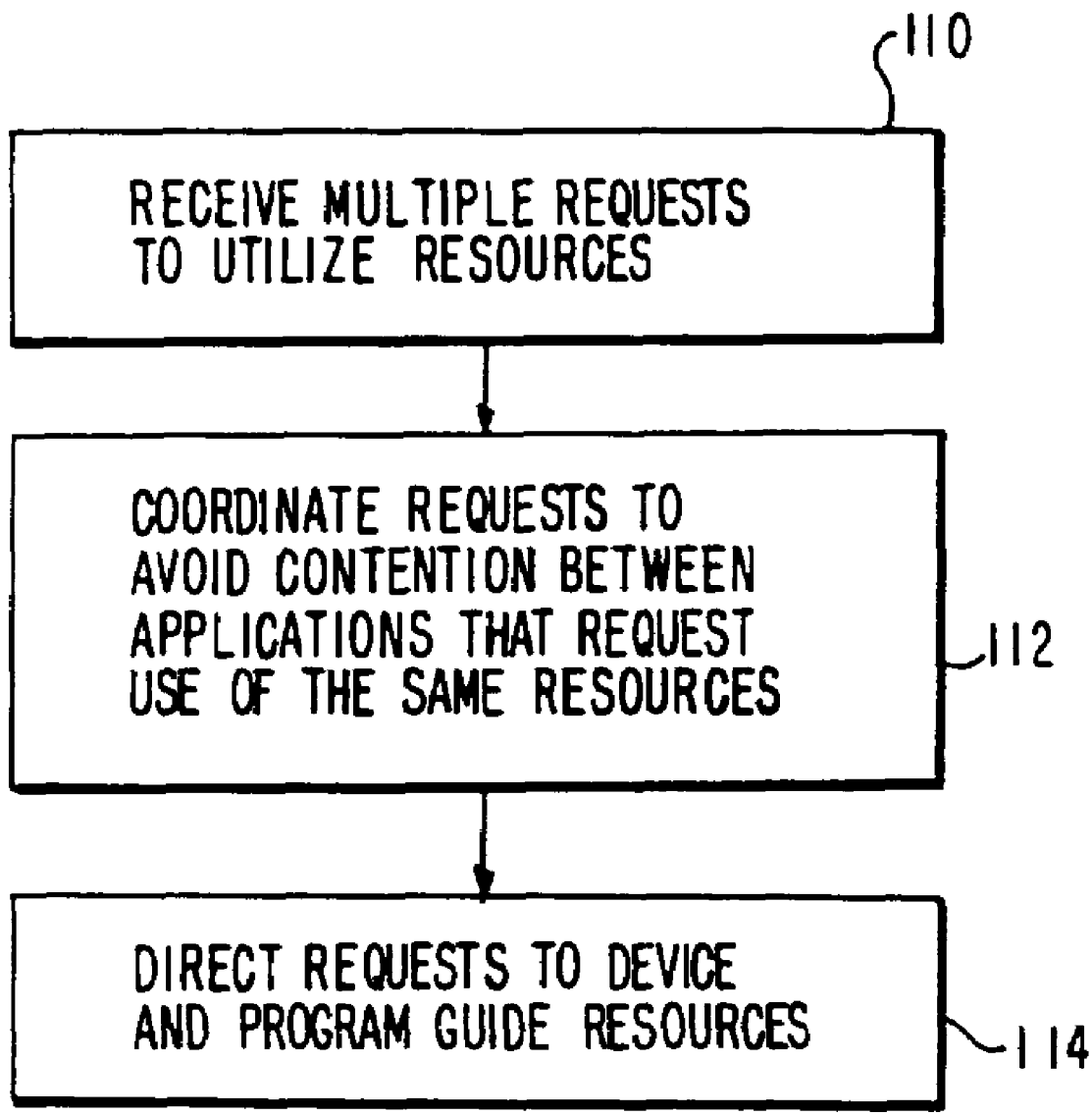
FIG. 4b is a flow chart of illustrative steps involved in processing multiple requests to utilize resources with the program guide application interface in accordance with the present invention.

When more than one application makes resource requests (for device and/or program guide resources) at the same time, the program guide application interface coordinates the multiple requests so as to avoid contention between applications for the same resources, as shown in FIG. 4b. At step 110, the program guide application interface receives multiple requests from different applications. For example, the program guide application interface may receive simultaneous requests to use display resource 66a from a home shopping application and from the program guide. At step 112, the program guide application interface coordinates the requests thereby resolving the conflicts between the various requesting applications. Any suitable technique may be used to resolve conflicts. For example, the program guide application interface may always favor the program guide over non-program guide applications. Another technique involves weighing the importance of the various requests. With this approach, each application may attach a weight to its requests indicating how urgently the requested resource is needed. Yet another technique for resolving conflicts between multiple applications that request resources at the same time involves using lists that set forth the resource requirements of the applications. For example, each application may submit to the application interface a predefined list of which keys (part of user input interface resource 66b) are desired when that application is active (i.e., an active key list) and a list of which keys are desired when the application is running in the background (i.e., a background key list). The application interface may take the contents of such lists into account when deciding how to resolve a conflict between two applications that are requesting use of the same remote control key or any other shared resource. In resolving conflicts, the application interface may take into account that certain resources may be shared, some resources may not be shared, and other resources may be shared, but only through the intervention of the application interface. An example of a resource that may be shared through the intervention of the application interface are the front-panel set-top box light-emitting diodes. At step 114, the program guide application interface directs resource requests to the device and program guide resources.

In order to facilitate operation of the system of the present invention with multiple applications, program guide application interface 54 maintains a registered application list 78 (FIG. 3) that allows interface 54 to keep track of which applications are loaded in set-top box 24 (FIG. 2) and how to communicate with them.

Figure 5:
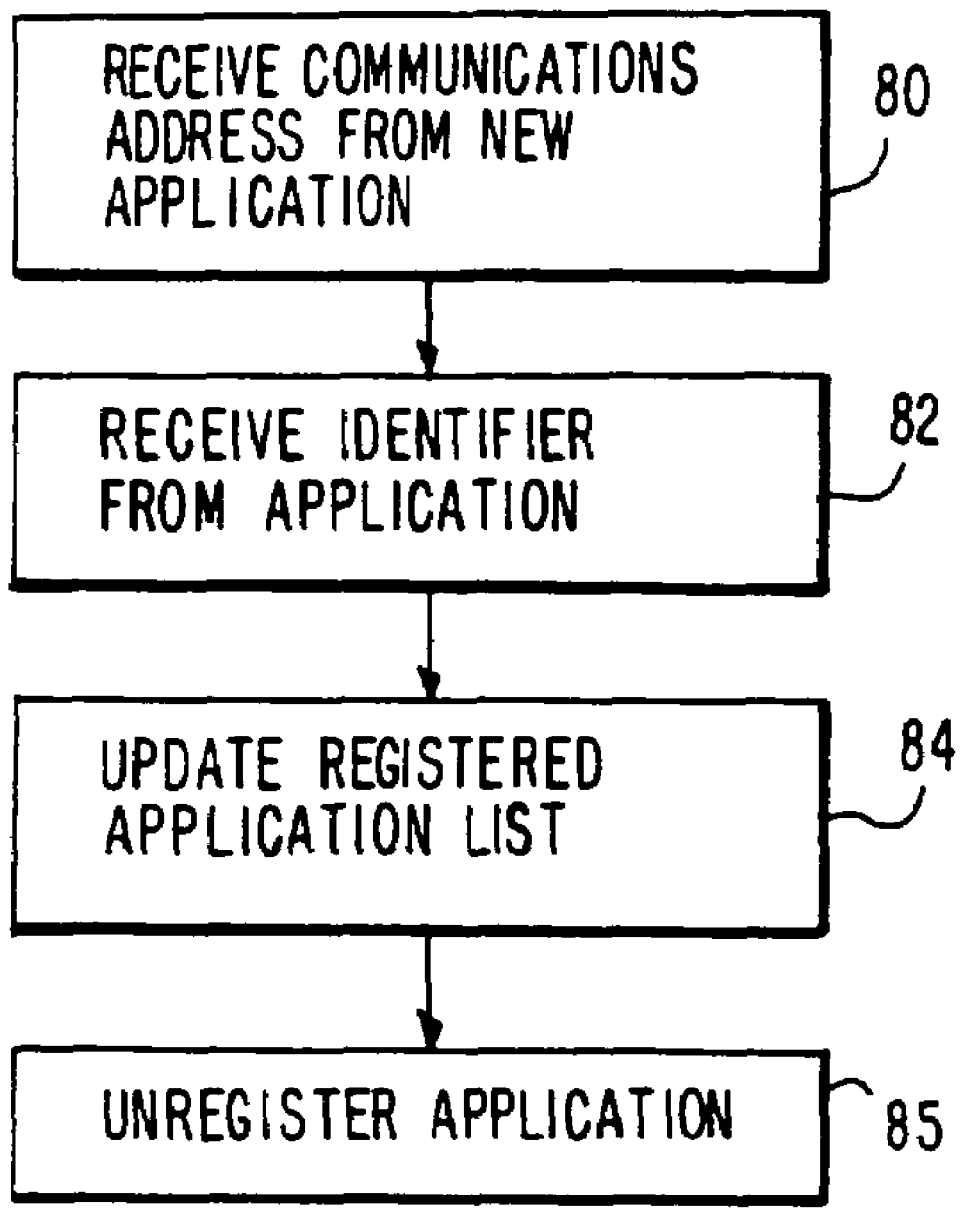
FIG. 5 is a flow chart of illustrative steps involved in registering applications with the program guide application interface and maintaining a list of registered applications in accordance with the present invention.

The process by which program guide application interface 54 maintains registered application list 78 is shown in FIG. 5. An application registers by supplying a communications address and an identifier to program guide application interface 54. The communications address and identifier are received by program guide application interface 54 at steps 80 and 82. At step 84, program guide application interface 54 updates registered application list 78 of FIG. 3 accordingly. At a later time, a registered application may be unregistered (step 85).

The communications addresses in list 78 are used by program guide application interface 54 in sending messages (data or commands) to the various registered applications. Messages from the applications to program guide application interface 54 are tagged with appropriate identifiers. Program guide application interface 54 may identify which application provided a given message by comparing the identifier accompanying the received message to the identifiers in list 78.

Another function of program guide application interface 54 involves processing control requests from various applications (including the program guide application). For example, video-on-demand application 60 may request control in order to turn on a message light or to display a message informing the user that the desired video selection is about to be delivered. If another application (e.g., shopping application 64) currently has primary control of set-top box 24 (FIG. 1), program guide application interface 54 transfers the control request from video-on-demand application 60 to shopping application 64, which may then decide whether to relinquish control.

Figure 6A:
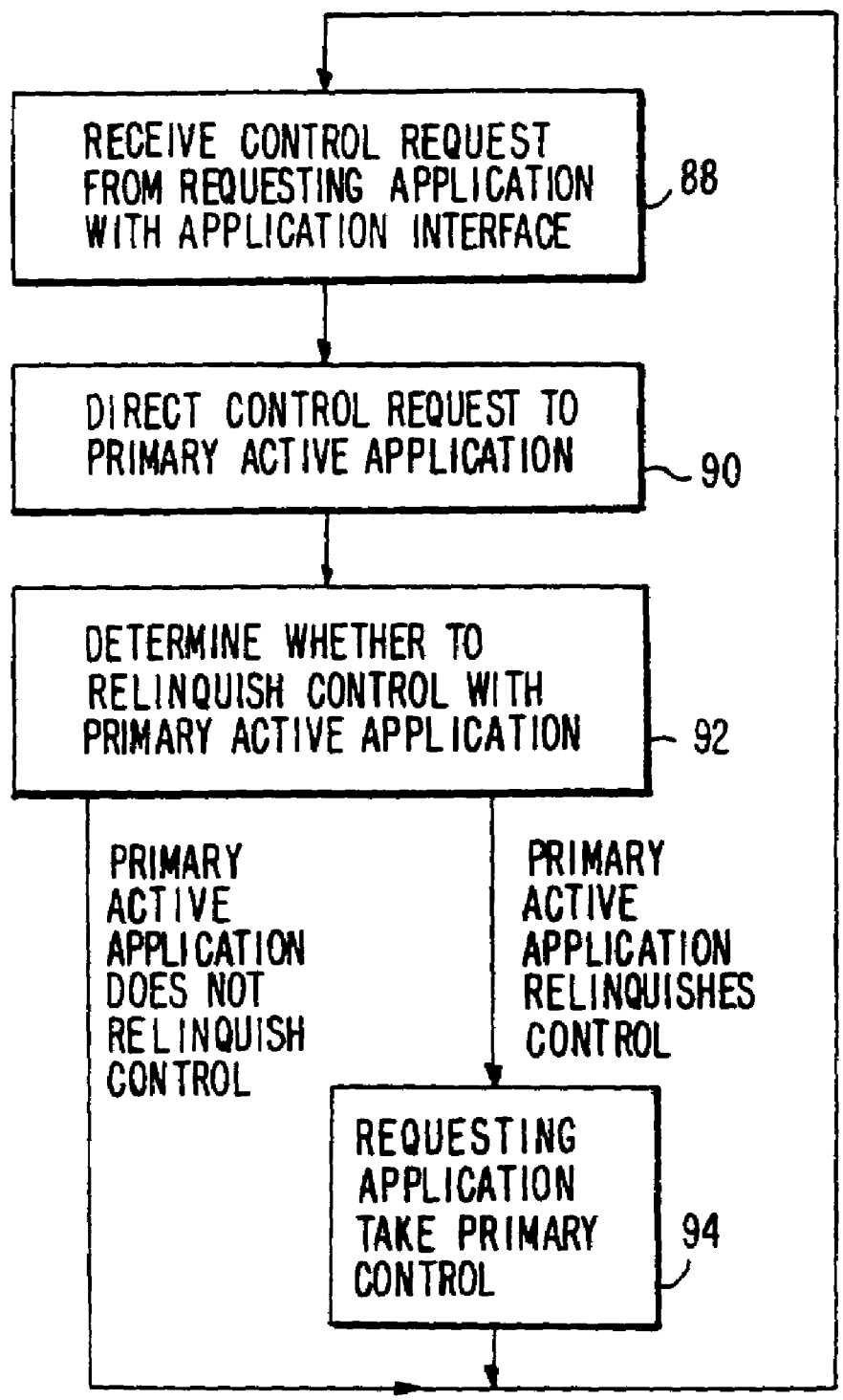
FIG. 6a is a flow chart of illustrative steps involved in processing control requests with the program guide application interface in accordance with the present invention.

Program guide application interface 54 contains control request processor 86 for handling control requests. Steps involved in processing control requests with control request processor 86 are shown in FIG. 6a. At step 88, control request processor 86 of program guide application interface 54 receives a control request from a requesting application (e.g., video-on-demand application 60). At step 90, control request processor 86 determines which application is the current primary application and directs the control request to that application. At step 92, the primary application (e.g., shopping application 64) determines whether to relinquish control based on preset or dynamic priorities. If the primary application does not relinquish control to the requesting application at step 92, control returns to step 88. If the primary application does relinquish control at step 92, the requesting application takes primary control of the operation of set-top box 24 (FIG. 1) at step 94.

The operation of control request processor 86 that is shown FIG. 6a is illustrative only. Other suitable arrangements for handling control requests may be used. For example, program guide application interface 54 may handle the determination of which application should maintain primary control of the system rather than the primary application.

Figure 6B:
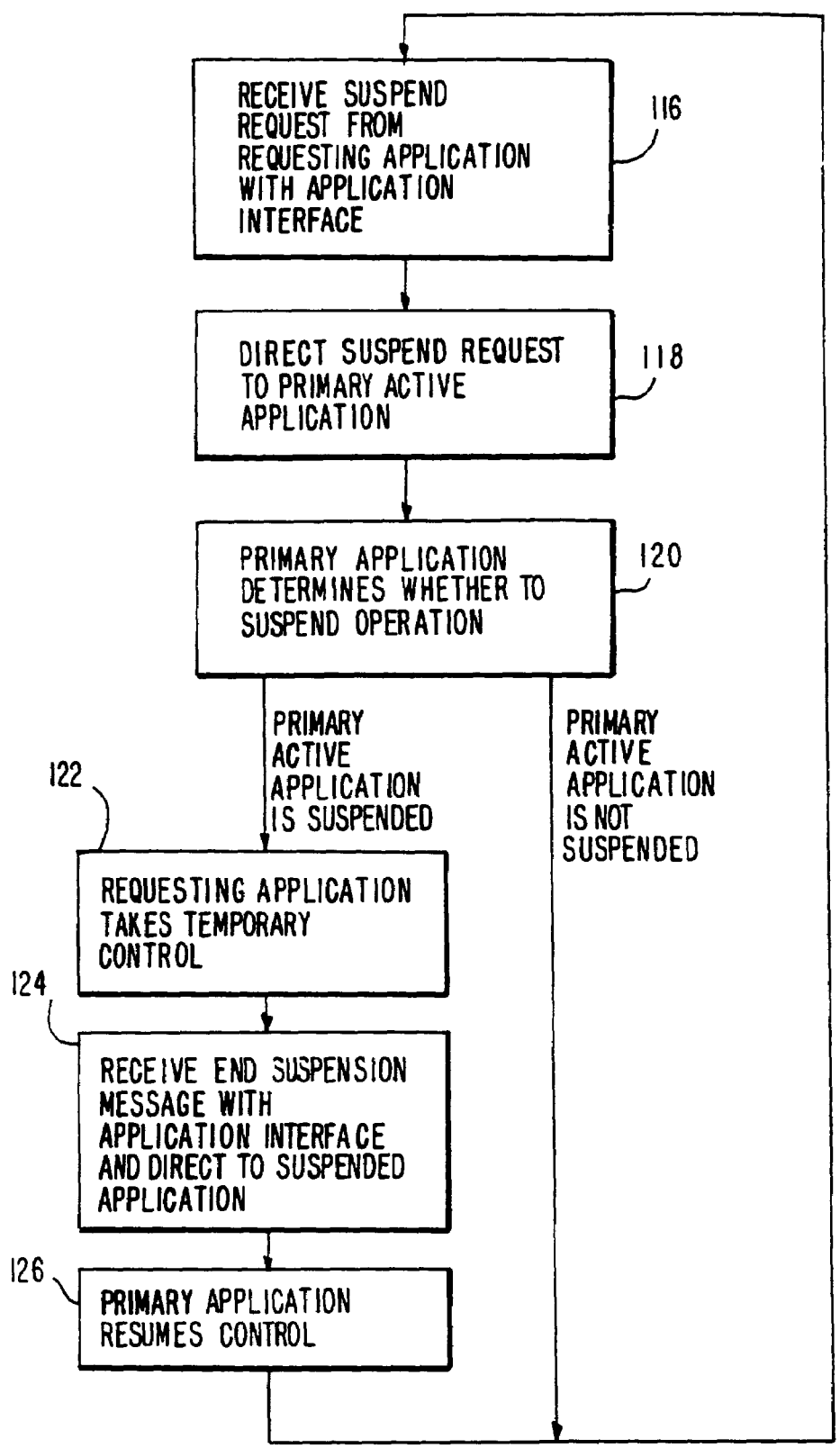
FIG. 6b is a flow chart of illustrative steps involved in processing suspend operation requests with the program guide application interface in accordance with the present invention.

As shown in FIG. 6b, control request processor 86 may also handle requests to suspend the operation of the primary application, rather than simply to terminate its operation. At step 116, control request processor 86 of program guide application interface 54 receives a suspend request from a requesting application (e.g., video-on-demand application 60). At step 118, control request processor 86 determines which application is the current primary application and directs the suspend request to that application. At step 120, the primary application (e.g., shopping application 64) determines whether to suspend its operation based on preset or dynamic priorities. If the primary application does not suspend its operation at step 120, control returns to step 116. If the primary application does suspend its operation at step 120, the requesting application takes temporary control of the operation of set-top box 24 (FIG. 1) at step 122. The suspension of operation of the primary application may be terminated by a control request directing the requesting application that is in temporary control to relinquish control. Alternatively, at step 124 the program guide application interface may receive an end suspension message and may direct the end suspension message to the primary application whose operation is being temporarily suspended. The primary application may then resume control at step 126. If desired, control request processor 86 may handle both control requests to relinquish control (as shown in FIG. 6a) and suspend operation requests to suspend operation (as shown in FIG. 6b).

Figure 7:
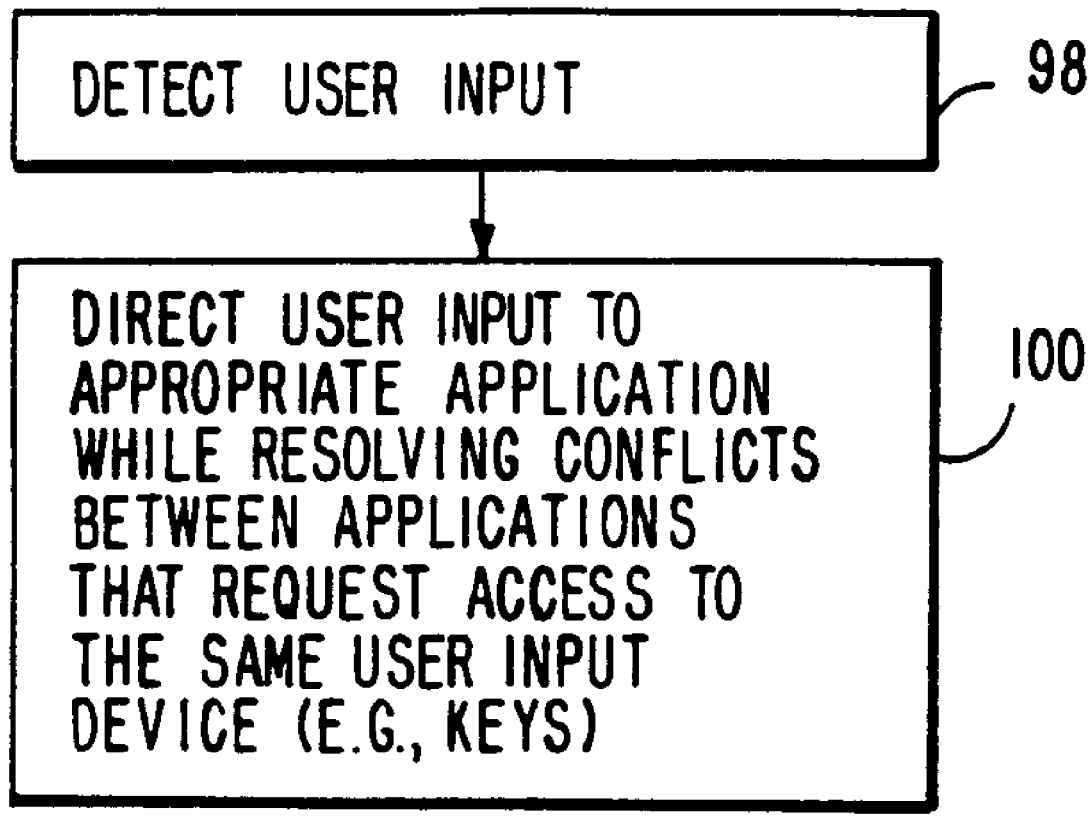
FIG. 7 is a flow chart of illustrative steps involved in directing user input to the appropriate application with the program guide application interface of the present invention.

Another function of program guide application interface 54 is to intercept input from the user interface (e.g., remote control 30a, infrared keyboard 30b, pointing device 30c, etc.) and to direct that input to the appropriate application running within set-top box 24. As shown in FIG. 3, program guide application interface 54 has user interface input director 96 for directing keystrokes, remote control button presses, mouse clicks, etc. to applications 56, 58, 60, 62, and 64. The operation of user interface input director 96 is shown in FIG. 7. At step 98, user interface input director 96 detects user input. At step 100, this user input is directed to the appropriate application while conflicts between applications are resolved. In order to resolve conflicts that may occur when multiple applications request access to the same user input device (e.g., remote control keys), each application may submit to the application interface a predefined list of which keys are desired when that application is active (an active key list) and a list of which keys are desired when the application is running in the background (a background key list). Applications may submit such key lists to the application interface at device registration (FIG. 5) or dynamically, at any suitable time during the operation of the system. Applications may assign priorities to their key requests by adding priority entries to the key lists if desired. The application interface may take the contents of such lists into account when deciding how to resolve a conflict between two applications that are requesting use of the same remote control key.

The foregoing is merely illustrative of the principles of this invention and various modifications can be made by those skilled in the art without departing from the scope and spirit of the invention.

What is claimed is:

1. A method for allowing non-guide applications implemented on user television equipment to use device resources within the user television equipment and program guide resources associated with an interactive television program guide implemented on the user television equipment, the method comprising:

receiving, with a program guide application interface, a request directly from a requesting non-guide application to use one of a device resource and a program guide resource; and directing the request to the one of the device resource and the program guide resource using the program guide application interface.

2. The method defined in claim 1 wherein the device resource is selected from the group consisting of an on-screen display resource, a front-panel display resource, a user input interface resource, a tuner resource, a communications circuitry resource, a set-top box resource, and a memory resource.

3. The method defined in claim 1 wherein the program guide resource is selected from the group consisting of a tuning resource, a parental control resource, a graphics library resource, a pay program purchasing resource, a program guide database access resource, a scheduling resource, and a program guide menu resource.

4. The method defined in claim 1 further comprising maintaining a registered application list.

5. The method defined in claim 1 further comprising processing control requests from the interactive television program guide and non-guide applications.

6. The method defined in claim 1 further comprising directing user input to the interactive television program guide and non-guide applications.

7. The method defined in claim 1 further comprising coordinating multiple requests to utilize the device resource.

8. The method defined in claim 1 further comprising coordinating multiple requests to utilize the program guide resource.

9. The method defined in claim 1 further comprising suspending the operation of one of the applications.

10. The method defined in claim 1 further comprising resolving conflicts between applications that desire access to a user input device at the same time.

11. The method defined in claim 1 further comprising resolving conflicts between applications that request access to the same remote control keys of a remote control at the same time.

12. A system for allowing non-guide applications implemented on user television equipment to use device resources within the user television equipment and program guide resources associated with an interactive television program guide implemented on the user television equipment, the system comprising:
means for receiving, with a program guide application interface, a request directly from a requesting non-guide application to use one of a device resource and a program guide resource; and
means for directing the request to the one of the device resource and the program guide resource using the program guide application interface.

13. The system defined in claim 12 wherein the device resource is selected from the group consisting of an on-screen display resource, a front-panel display resource, a user input interface resource, a tuner resource, a communications circuitry resource, a set-top box resource, and a memory resource.

14. The system defined in claim 12 wherein the program guide resource is selected from the group consisting of a tuning resource, a parental control resource, a graphics library resource, a pay program purchasing resource, a program guide database access resource, a scheduling resource, and a program guide menu resource.

15. The system defined in claim 12 further comprising means for maintaining a registered application list.

16. The system defined in claim 12 further comprising means for processing control requests from the interactive television program guide and non-guide applications.

17. The system defined in claim 12 further comprising means for directing user input to the interactive television program guide and non-guide applications.

18. The system defined in claim 12 further comprising means for coordinating multiple requests to utilize the device resource.

19. The system defined in claim 12 further comprising means for coordinating multiple requests to utilize the program guide resource.

20. The system defined in claim 12 further comprising means for suspending the operation of one of the applications.

21. The system defined in claim 12 further comprising means for resolving conflicts between applications that desire access to a user input device at the same time.

22. The system defined in claim 12 further comprising means for resolving conflicts between applications that request access to the same remote control keys of a remote control at the same time.

23. A system for allowing non-guide applications to use device resources and program guide resources, the system comprising:
user television equipment on which a plurality of device resources, an interactive television program guide having a plurality of program guide resources, and a program guide application interface are implemented; and
wherein the program guide application interface is configured to:
receive a request directly from a requesting non-guide application to use one of a device resource and a program guide resource; and
directing the request to the one of the device resource and the program guide resource.

24. The system defined in claim 23 wherein the device resource is selected from the group consisting of an on-screen display resource, a front-panel display resource, a user input interface resource, a tuner resource, a communications circuitry resource, a set-top box resource, and a memory resource.

25. The system defined in claim 23 wherein the program guide resource is selected from the group consisting of a tuning resource, a parental control resource, a graphics library resource, a pay program purchasing resource, a program guide database access resource, a scheduling resource, and a program guide menu resource.

26. The system defined in claim 23, wherein the program guide application interface is further configured to maintain a registered application list.

27. The system defined in claim 23, wherein the program guide application interface is further configured to process control requests from the interactive television program guide and non-guide applications.

28. The system defined in claim 23, wherein the program guide application interface is further configured to direct user input to the interactive television program guide and non-guide applications.

29. The system defined in claim 23, wherein the program guide application interface is further configured to coordinate multiple requests to utilize the device resource.

30. The system defined in claim 23, wherein the program guide application interface is further configured to coordinate multiple requests to utilize the program guide resource.

31. The system defined in claim 23, wherein the program guide application interface is further configured to suspend the operation of one of the applications.

32. The system defined in claim 23 further comprising:
a user input device; and
wherein the program guide application interface is further configured to resolve conflicts between applications that desire access to the user input device at the same time.

33. The system defined in claim 23 further comprising:
a remote control; and
wherein the program guide application interface is further configured to resolve conflicts between applications that request access to the same remote control keys of the remote control at the same time.

34. Computer-readable media for allowing non-guide applications implemented on user television equipment to use device resources within the user television equipment and program guide resources associated with an interactive television program guide implemented on the user television equipment, wherein the computer-readable media is encoded with a computer program thereon for:

receiving, with a program guide application interface, a request directly from a requesting non-guide application to use one of a device resource and a program guide resource; and directing the request to the one of the device resource and the program guide resource using the program guide application interface.

35. The computer-readable media defined in claim 34 wherein the device resource is selected from the group consisting of an on-screen display resource, a front-panel display resource, a user input interface resource, a tuner resource, a communications circuitry resource, a set-top box resource, and a memory resource.

36. The computer-readable media defined in claim 34 wherein the program guide resource is selected from the group consisting of a tuning resource, a parental control resource, a graphics library resource, a pay program purchasing resource, a program guide database access resource, a scheduling resource, and a program guide menu resource.

37. The computer-readable media defined in claim 34, wherein the computer-readable media is further encoded with a computer program thereon for maintaining a registered application list.

38. The computer-readable media defined in claim 34, wherein the computer-readable media is further encoded with a computer program thereon for processing control requests from the interactive television program guide and non-guide applications.

39. The computer-readable media defined in claim 34, wherein the computer-readable media is further encoded with a computer program thereon for directing user input to the interactive television program guide and non-guide applications.

40. The computer-readable media defined in claim 34, wherein the computer-readable media is further encoded with a computer program thereon for coordinating multiple requests to utilize the device resource.

41. The computer-readable media defined in claim 34, wherein the computer-readable media is further encoded with a computer program thereon for coordinating multiple requests to utilize the program guide resource.

42. The computer-readable media defined in claim 34, wherein the computer-readable media is further encoded with a computer program thereon for suspending the operation of one of the applications.

43. The computer-readable media defined in claim 34, wherein the computer-readable media is further encoded with a computer program thereon for resolving conflicts between applications that desire access to a user input device at the same time.

44. The computer-readable media defined in claim 34, wherein the computer-readable media is further encoded with a computer program thereon for resolving conflicts between applications that request access to the same remote control keys of a remote control at the same time.

* * * * *